United States Patent [19]

Takeda et al.

[11] Patent Number: 4,472,346
[45] Date of Patent: Sep. 18, 1984

[54] ULTRASONIC FLAW DETECTOR DEVICE

[75] Inventors: Hiroyuki Takeda, Ohte; Kazuo Yamada, Izumi; Izumi Kobayashi, Higashikurume; Yousuke Ojiri, Kasugai; Shigeru Kajiyama, Hitachi, all of Japan

[73] Assignee: Hitachi, Ltd., Tokyo, Japan

[21] Appl. No.: 287,795

[22] Filed: Jul. 28, 1981

[51] Int. Cl.³ ............................................. G21C 17/00
[52] U.S. Cl. .................................... 376/246; 376/252; 73/633
[58] Field of Search ............... 376/232, 249, 250, 252; 73/633

[56] References Cited

U.S. PATENT DOCUMENTS

| 4,056,972 | 11/1977 | Bromwich | 376/249 |
| 4,299,656 | 11/1981 | Weber et al. | 376/249 |
| 4,336,104 | 6/1982 | Figlhuber et al. | 376/249 |

FOREIGN PATENT DOCUMENTS

| 2506415 | 8/1976 | Fed. Rep. of Germany | 376/249 |
| 2620715 | 11/1977 | Fed. Rep. of Germany | 376/249 |
| 2709023 | 9/1978 | Fed. Rep. of Germany | 376/249 |
| 2834108 | 12/1979 | Fed. Rep. of Germany | 376/249 |
| 2835082 | 1/1980 | Fed. Rep. of Germany | 376/289 |
| 48-72591 | 9/1973 | Japan | |

*Primary Examiner*—Sal Cangialosi
*Attorney, Agent, or Firm*—Antonelli, Terry & Wands

[57] ABSTRACT

An ultrasonic flaw detector device including axial and circumferential fixed tracks located in a space defined between a pressure vessel of a nuclear reactor and a heat insulating wall surrounding the vessel and arranged axially and circumferentially respectively of the pressure vessel of the nuclear reactor. A rotary track is located at a junction of the axial fixed track and the circumferential fixed track and moved in rotary movement by a chain and has its angle of rotation restricted by a pair of stoppers. A carrier member supporting an ultrasonic probe is moved on the tracks to effect ultrasonic flaw detection to detect any flow that might be present in the pressure vessel. To transfer the carrier member from the axial fixed track to the circumferential fixed track, the carrier member is first transferred from the axial fixed track to the rotatable track, and after the rotary track is rotated, the carrier member is transferred from the rotatable track to the circumferential fixed track.

20 Claims, 18 Drawing Figures

ULTRASONIC FLAW DETECTOR DEVICE

This invention relates to ultrasonic flaw detector devices, and more particularly it deals with a ultrasonic flaw detector device having particular utility for use in performing ultrasonic flaw detection with regard to the body of a pressure vessel of a nuclear reactor of an nuclear generating plant.

A pressure vessel of a nuclear reactor of a boiling-water type nuclear reactor includes a body having a flange and a lower end portion joined by welding to its upper end and its lower end respectively, and an upper cover including an upper end portion having a flange joined by welding to its lower end. The flange of the body and the flange of the upper cover are clamped together by means of bolts. The body is composed of two blocks of steel plate each bent in the form of a semicircle with the two semicircles being arranged to form a circle, and a plurality of blocks placed on top of and under the two blocks forming the circle. The blocks are joined by welding to one another. Thus the body of the pressure vessel has a plurality of weld lines extending circumferentially of the body (referred to as circumferential weld lines) and spaced apart from one another in the direction of height of the body, and a plurality of weld lines extending axially of the body (referred to as vertical weld lines) and spaced apart from one another in the circumferential direction.

The pressure vessel of a nuclear reactor is supported on a pedestal at its upper end, and surrounded by a cylindrical heat insulating wall and a cylindrical gamma shield. The gamma shield is supported on the upper end of the pedestal. The pressure vessel is spaced apart from the heat insulating wall disposed on its outer side a distance of about 200 mm. Two guide rails extending along the vertical weld lines are arranged in the space. A ultrasonic flaw detector moves on the pair of rails to perform ultrasonic flaw detection with regard to the vicinity of each of the vertical weld lines on the body of the pressure vessel (Japanese patent application Laid-Open No. 72591/73). Ultrasonic flaw detection with regard to the vicinity of each of the circumferential weld lines on the body of the pressure vessel is, however, beyond the power of a ultrasonic flaw detector of the prior art.

An object of this invention is to provide a ultrasonic flaw detector device capable of performing ultrasonic flaw detection with regard to a vessel in two directions thereof.

Another object is to provide a ultrasonic flaw detector device which is compact in size.

Still another object is to provide a ultrasonic flaw detector device capable of letting a carrier member to transfer smoothly from a fixed track arranged in one direction of a vessel to another fixed track arranged in another direction thereof.

The outstanding characteristic of the invention is that a second fixed track is arranged in a direction intersecting a first fixed track outside a vessel, and a rotary track is located at a junction of the first fixed track and the second fixed track.

A preferred example of the ultrasonic flaw detector device comprising a preferred embodiment of the invention as applied to a pressure vessel of a nuclear reactor of a boiling-water type nuclear generating plant will be described by referring to FIGS. 1–8.

The pressure vessel of a nuclear reactor of a boiling-water type nuclear generating plant includes a body 1, a flange 7 and a lower end portion 9 welded to the body 1, a skirt 10 welded to the lower end portion 9, an upper end portion 2, and a flange 8 welded to the upper end portion 2. The numeral 3 designates nozzles attached to the body 1. The pressure vessel of a nuclear reactor is supported on the upper end of a pedestal 13 placed in a containment vessel, not shown, with the skirt 10 of the body 1 being affixed to the pedestal 13. The flanges 7 and 8 are clamped together by means of bolts, and the body 1 is composed of semicircular blocks assembled and welded to each other. As a result, the body 1 has a plurality of circumferential weld lines 5 separated from one another in the direction of height of the body 1. Vertical weld lines 6 are located symmetrically with respect to the axis of the body 1 for each seam, so that they are located in circumferentially different positions for the blocks of different layers. The vertical weld lines 6 between the blocks of each layer are each displaced from the corresponding one of the vertical weld lines 6A of the adjacent layers by a distance of about 300 mm. A portion of each of the vertical weld lines 6 is interposed between the nozzles 3A and 3B. The vertical weld lines 6 and 6A are each located symmetrically in two positions with respect to the center axis of the body 1. The pressure vessel is surrounded by cylindrical heat insulating walls 11A and 11B and a cylindrical gamma shield wall 12. The heat insulating wall 11A is secured to the body 1 by a bracket 4, and the heat insulating wall 11B is disposed on the wall 11A and can be detached therefrom when the upper end portion 2 is removed from the body 1. The gamma shield wall 12 is supported on the upper end of the pedestal 13.

Figure 1:
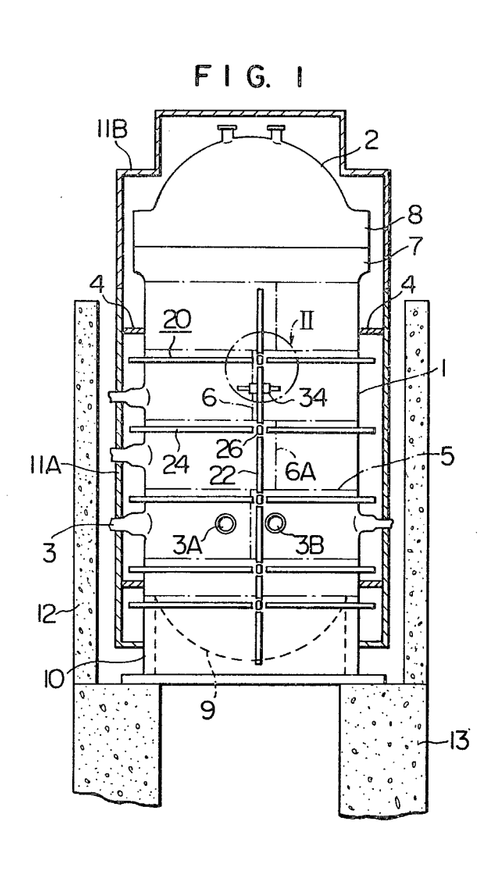
FIG. 1 is a general view of the ultrasonic flaw detector device comprising a preferred embodiment of the invention, which is arranged for a pressure vessel of a nuclear reactor of a boiling-water type nuclear generating plant.

A ultrasonic flaw detector device 20 comprises guide rails 21, a movable truck 34, movable truck drive means 38, an arm 58 and a probe 72. The guide rails 21 comprise, as shown in FIG. 1, a track (fixed track) 22 extending axially of the body 1 of the pressure vessel, a track (fixed track) 24 extending circumferentially of the body 1, and a switching mechanism 26. The track 22 extends axially of the body 1 along the vertical weld lines 6. Since the vertical weld lines 6 are located in two positions circumferentially spaced apart from each other with the center axis of the body 1 therebetween, two tracks 22 are arranged circumferentially of the body 1. The track 24 extends along each of the circumferential weld lines 5. The switching mechanism 26 is located in the vicinity of an intersection of the vertical weld line 6A and the circumferential weld line 5 or at a junction of the tracks 22 and 24.

Figure 2:
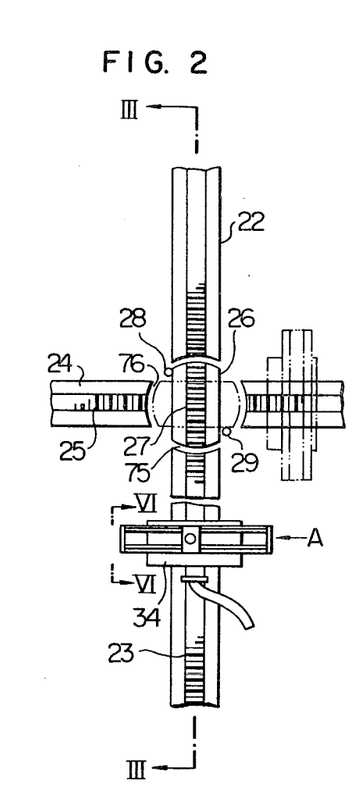
FIG. 2 is a view, on an enlarged scale, of the guide rails shown in the portion II in FIG. 1.
Figure 3:
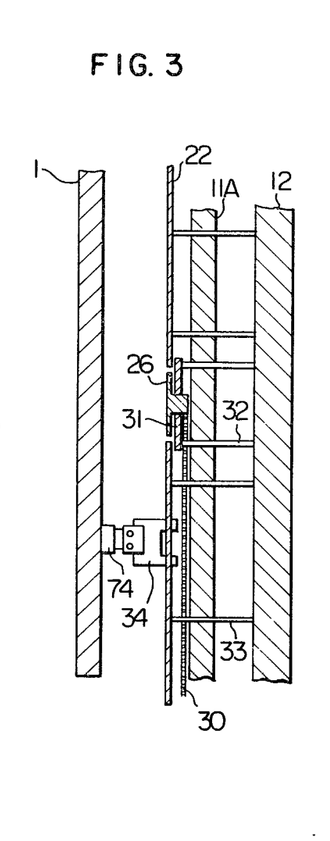
FIG. 3 is a sectional view taken along the line III—III in FIG. 2.

The guide rails 21 will be described in detail with regard to their construction by referring to FIGS. 2 and 3. FIG. 2 shows, on an enlarged scale, the portion II shown in FIG. 1, as seen from the external surface of the body 1 toward the heat insulating wall 11A. A rack 23 is attached to the surface of the track 22 facing the body 1, and the track 22 is supported on support members 33 extending through the heat insulating wall 11A secured to the gamma shield wall 12. Like the track 22, the track 24 is secured to the gamma shield wall 12 by the support members 33, and a track 25 is attached to the surface of the track 24 facing the body 1.

The construction of the switching mechanism 26 will be described by referring to FIGS. 4 and 5. The switching mechanism 26 comprises a support plate 31, and a rotary track 14. The support plate 31 is secured to support members 32 extending through the gamma shield wall 12 and secured to the gamma shield wall 12. The rotary track 14 is rotatably supported on the support plate 31 having four rollers 15 in contact with the under-surface of the rotary track 14. Stoppers 28 and 29 for restricting the rotational angle of the rotary track 14 is supported on the support plate 31. A sprocket 16 having a chain 30 trained thereover is fixed to a rotary shaft 17 of the rotary track 14.

The rotary track 14, track 22 and track 24 are located between the pressure vessel of the nuclear reactor and the heat insulating wall 11A. The zone between the pressure vessel and the heat insulating wall 11A is normal in temperature when the reactor is shutdown. However, during operation of the reactor, the temperature rises to about 300° C. As a result, the guide rails 21 mounted around the pressure vessel undergo marked thermal expansion. In order to accommodate the thermal expansion that the guide rails 31 might undergo, gaps 75 and 76 are formed between the track 22 and the rotary track 14 and between the track 24 and the rotary track 14 respectively. Projections 78A, 78B and 78C are formed at opposite end portions of the rotary track 14 and end portions of the tracks 22 and 24 juxtaposed against the opposite end portions of the tracks 22 and 24 respectively.

The movable truck 34 is movable supported on each guide rail 21 by guide rollers 36 supported by respective guide members 35. Four support members 35 are attached to the upper portion of the movable truck 34 and each have two guide rollers 36 which are engaged in guide grooves 37 formed on one side of the tracks 22 and 24 and the rotary track 14.

Figure 8:
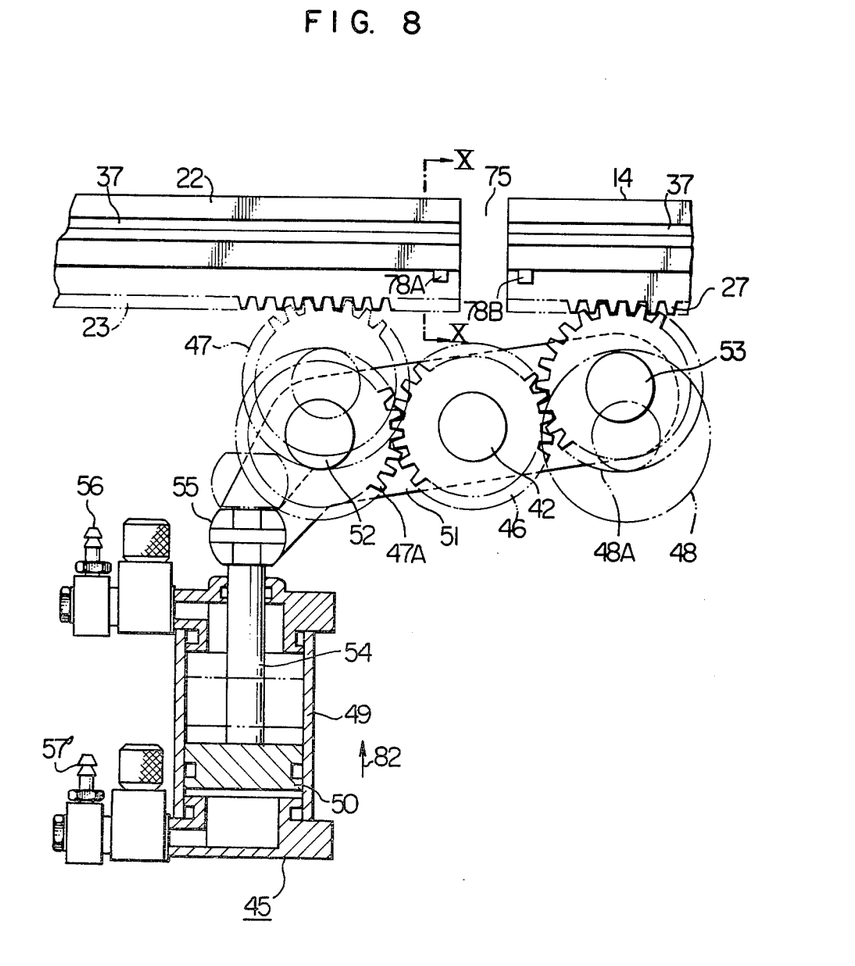
FIG. 8 is a sectional view taken along the line VIII—VIII of the pinion switching mechanism shown in FIG. 7.

The movable truck 34 supports thereon a movable truck drive means 38 including a motor 39, and a pinion switching mechanism 45. The motor 39 is mounted within the movable truck 34 and has a worm gear 40 secured to its rotary shaft and maintained in meshing engagement with a worm wheel 41 supported by a rotary shaft 42 connected to the movable truck 34. The pinion switching mechanism 45 comprises a gear 46 supported on the rotary shaft 42. FIG. 8 shows the detailed construction of the pinion switching mechanism 45 further comprising a pair of pinions 47 and 48, a cylinder 49 and a piston 50. The pinion (first drive wheel) 47 is supported by a rotary shaft 52 connected to a pair of bars 51 which in turn are connected to the rotary shaft 42, and the pinion (second drive wheel) 48 is supported on a rotary shaft 53 connected to the bars 51. The gears 46 and pinions 47 and 49 are interposed between the two bars 51, and the pinions 47 and 48 are located in front of and at the rear of the gear 46 respectively so as to mesh therewith. The piston 50 is inserted in the cylinder 49 supported on the movable truck 34. The piston 50 is connected to a piston rod 54 connected to the pair of bars 51 through a ball joint 55.

Figure 6:
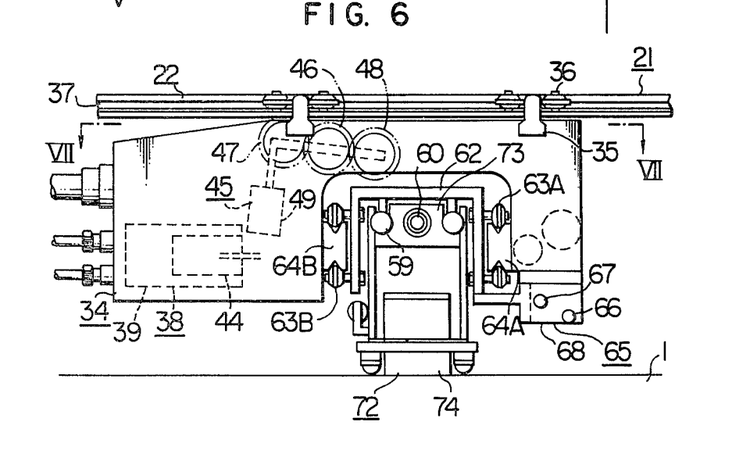
FIG. 6 is a view as seen in the direction of the arrows VI—VI of the movable truck shown in FIG. 6.
Figure 7:
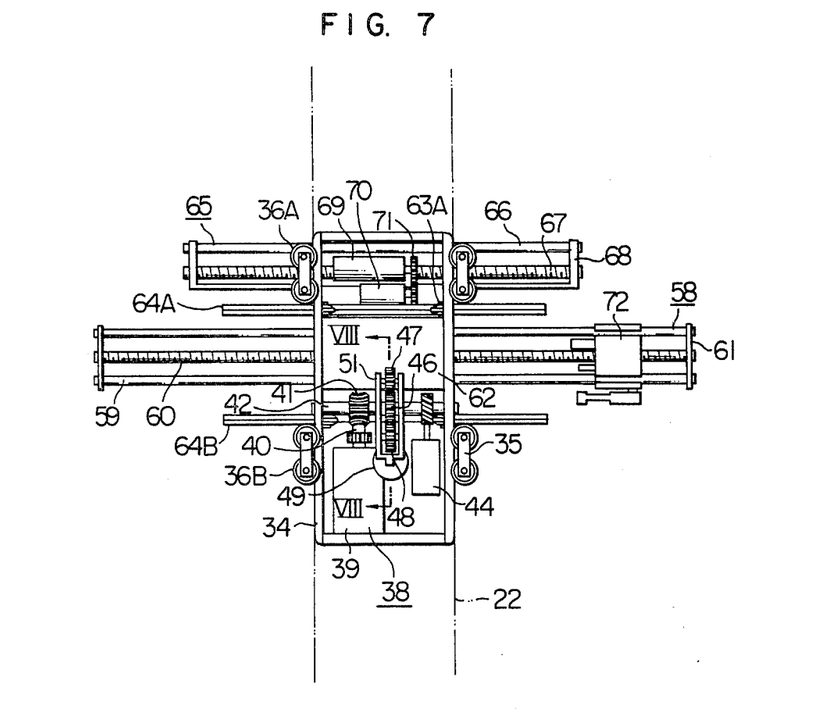
FIG. 7 is a view as seen in the direction of the arrows VII—VII in FIG. 6.

The arm 58 comprises a pair of rods 59 and a feed screw 60, and extends in a direction at right angles to the tracks. The arm 58 is movable connected to the movable truck 34 as presently to be described. The rods 59 and feed screw 60 have connecting plates 51 each attached to one of opposite ends of the rods 59 and feed screw 60, as shown in FIG. 7. A track 62 is connected to each of the rods 59 as shown in FIG. 6 and has a pair of guide rollers 63A and 63B attached to each side thereof, which engage in guide grooves formed in the guide rails 64A and 64B respectively. The guide rails 64A and 64B each have a curvature equal to the curvature of the outer surface of the body 1.

A shift mechanism 65 for shifting the arm 58 in a direction at right angles to each track will now be described. The shift mechanism 65 comprises a rod 66, and a feed screw 67 secured at opposite ends to a case 68 attached to the track 62. A motor 69 and a potentiometer 70 are supported on the movable truck 34. The motor 69 has a gear 71 supported on its rotary shaft which meshes with a serration formed on the external surface of a nut, not shown, meshing with the feed screw 67.

The probe 72 is composed of a probe holder 73 and a probe head 74. The pair of rods 59 are each received in one of a pair of grooves formed in the probe holder 73. The feed screw 60 of the arm 58 is in threadable engagement in an internally threaded portion formed in the probe holder 73.

Figure 9:
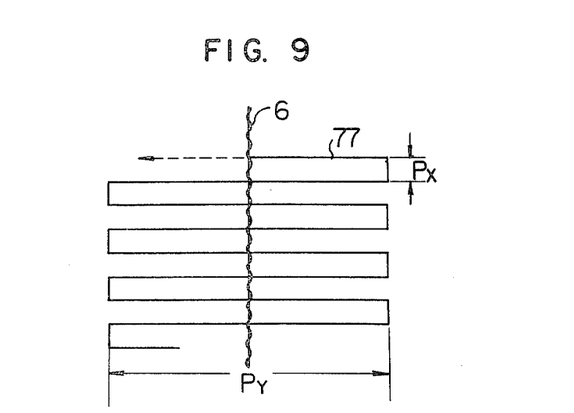
FIG. 9 is a view in explanation of the path of movement of the probe head in a ultrasonic flaw detecting operation performed on a nuclear reactor pressure vessel.

A ultrasonic flaw detecting operation performed by using the ultrasonic flaw detector device 20 on the pressure vessel of a nuclear reactor of a boiling-water type nuclear generating plant will be described. Ultrasonic flaw detection is carried out while the reactor is being shut down. Initially the device 20 is located at a point A (FIG. 2) on the track 22. Compressed air is supplied to the cylinder 49 of the pinion switching mechanism 45 through a connecting pipe 57. This moves the piston 50 (See FIG. 8) toward the heat insulating wall 11A as indicated by an arrow 82 and causes the pair of bars 51 through the piston rod 54 to rotate about the rotary shaft 42, to bring the pinion 47 into meshing engagement with the rack 23 as indicated by dash-and-dot lines. The pinion 48 is out of engagement with the rack 27 as indicated by dash-and-dot lines. As the motor 39 is driven, rotational force is transmitted through the worm gear 40, worm wheel 41, rotary shaft 42 and gear 46 to the pinion 47 which is in meshing engagement with the rack 23, so that the movable truck 34 is moved along the track 22 axially of the pressure vessel of the nuclear reactor to an upper portion thereof as shown in FIG. 1. Actuation of a motor, not shown, mounted on the truck 62 rotates the feed screw 60 and moves the probe head 74 along the rods 59 of the arm 58 in a direction which is at right angles to the track 22. In this way, a movement Px of the movable truck 34 and a movement Pr of the probe head 74 on the arm 58 are repeated as shown in FIG. 9. Thus the probe head 74 moves along a path 77 while being in contact with the surface of the pressure vessel of the nuclear reactor, to perform ultrasonic flaw detection in the vicinity of each vertical weld line 6.

The position of the probe head 74 is determined by an encoder 44 and an encoder, not shown, connected to the motor, not shown, for driving the feed screw 60.

Figure 10:
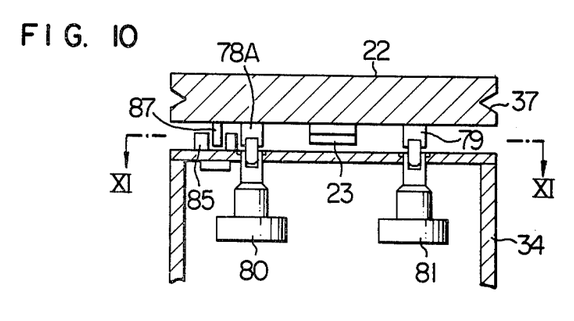
FIG. 10 is a sectional view taken along the line X—X in FIG. 6.

Ultrasonic flaw detection with regard to the vicinity of the circumferential weld lines 5 is performed as follows. To perform ultrasonic flaw detection with regard to each circumferential weld line 5 requires switching the movable truck 34 from the track 22 to the track 24 by means of the switching mechanism 26. The operation of transferring the movable truck 34 from the track 22 to the rotary track 14 will be described by referring to FIGS. 7, 8 and 10. As the movable truck 34 approaches the gap 75, the guide rollers 36A are released from engagement in the guide grooves 37 of the track 22 and brought into engagement in the guide grooves 37 of the rotary track 14. While the guide rollers 36A are moving through the gap 75, the guide rollers 36B support the movable truck 34 on the track 22. The movable truck 34 supports thereon a limit switch (interposed between the rotary shafts 42 and 52) 80 which produces a signal a when it impinges on a projection 78A. If the motor 39 is rotating in the positive direction (the direction in which the movable truck 34 is moved toward the upper portion of the pressure vessel) at this time, then the signal a produced by the limit switch 80 interrupts the supply of compressed air through the connecting pipe 57 and allows compressed air to be supplied through a connecting pipe 56 to the cylinder 49. The piston 50 moves toward the pressure vessel (the direction opposite to the arrow 82) and the bars 51 rotate. The pinion 47 is released from the rack 23 and moves to a solid line position 47A, and the pinion 48 moves to a solid line position 48A and is brought into meshing engagement with the rack 27 on the rotary track 14. In switching between the pinions, the movable truck 34 is stopped by the signal a and prevented from being dislodged from the track 22 by gripping opposite sides of the track 22 by arms projecting from opposite sides of the movable truck 34. This because it is necessary to avoid downward movement of the movable truck 34 as the pinions 47 and 48 are temporarily released from the track when switching thereof is effected. When the movable truck 34 is on the track 24 it is not necessary to hold the movable truck 34 in place by the arms. After switching of the pinions is effected, the arms are removed from the opposite sides of the track 22. Thereafter the movable truck 34 is moved by the meshing engagement of the pinion 48 with the rack 27.

Thus by using the pinion switching mechanism 45 of a simple construction, it is possible to smoothly transfer the ultrasonic flaw detector device 20 from the track 22 to the rotary track 14. This is conducive to reduced time for performing ultrasonic flaw detection and improved reliability of the ultrasonic flaw detector device. Upon the limit switch 80 being brought into contact with another projection 78B, a signal b is generated and compressed air is supplied from the connecting pipe 57 to the cylinder 49. This moves the piston 50 in the direction of the arrow 82, to bring the pinion 47 into meshing engagement with the rack 27. The arms are actuated again at this time to prevent the movable truck 34 from being dislodged from the track. The movable truck 34 moves on the rotary track 14, and a limit switch 81 produces a signal c it is brought into contact with a projection 79 on the rotary track 14, to stop rotation of the motor 39 and bring the movable truck 34 to a halt on the rotary track 14.

Figure 4:
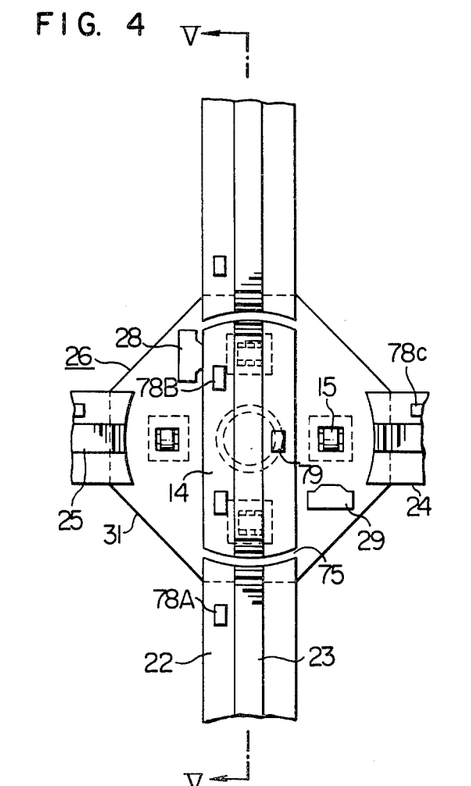
FIG. 4 is a detailed view of the rotary track shown in FIG. 2.
Figure 5:
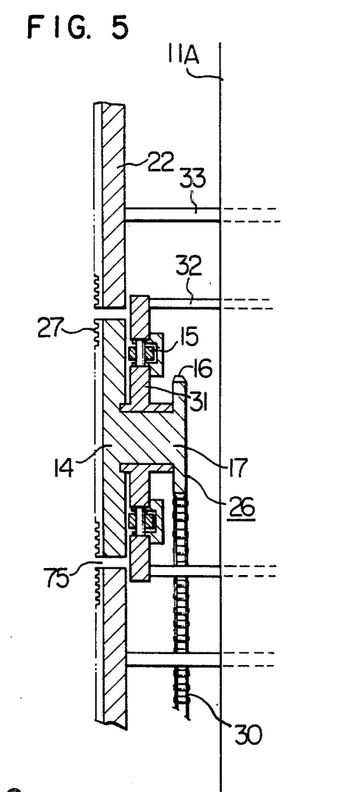
FIG. 5 is a sectional view taken along the line V—V in FIG. 4.

Thereafter the chain 30 extending to the lower end portion of the pressure vessel and outwardly of the gamma shield wall 12 to its outer side is actuated, to rotate the rotary track 14 clockwise in FIG. 4. The rotary track 14 stops rotating as it abuts against the stopper 29. The presence of the stoppers facilitates positioning of the rotary track 14 with respect to the track 24 (and the track 22). Rotation of the motor 39 in the positive direction moves the movable truck 34 toward the track 24 disposed rightwardly of the track 24 in FIG. 1. As the limit switch 80 is brought into contact with the projection 78B at one end of the rotary track 14, a signal a is produced and the aforesaid operation is performed to transfer the movable truck 34 from the rotary track 14 to the track 24. Upon completion of the transfer, the projection 78C on the track 24 produces a signal b to release the pinion 48 from engagement with the rack 25 and to bring the pinion 47 into meshing engagement with the rack 25. Rotation of the pinion 47 causes the movable truck 34 to travel on the track 24, to perform ultrasonic flaw detection in the vicinity of the circumferential weld line 5. This ultrasonic flaw detection is performed in such a manner that, as is the case with the ultrasonic flaw detection performed in the vicinity of the vertical weld line, movement of the movable truck 34 on the track 24 and movement of the probe head 74 on the arm 58 takes place alternately and repeatedly. The provision of the switching mechanism 26 allows transfer of the movable truck 34 from the axially extending track 22 to the circumferentially extending track 24 to be readily effected. This makes it possible to readily effect ultrasonic flaw detection circumferentially of the pressure vessel of the nuclear reactor by using the single movable truck 34 provided with the probe head 74. The distances between the surface of the body 1 and the tracks 22 and 24 and the rotary track 14 being equal, it is possible to reduce the height of the ultrasonic flaw detector device 20 (from the probe head 74 to the tracks). Thus the device can be readily mounted in a narrow space between the pressure vessel of the nuclear reactor and the heat insulating wall 11A.

When the movable truck 34 is transferred upwardly to the rotary track 14 from the track 22 below and the rotary track 14 is not rotated, it is possible to further transfer the movable truck 34 upwardly to the track 22 above. The aforesaid pinion switching mechanism 45 is rendered operative to enable transfer of the movable truck 34 from track to track to be smoothly effected.

When ultrasonic flaw detection is performed in the vicinity of the vertical weld line 6A, the motor 69 is actuated to cause a nut, not shown, meshing with the gear 71 to rotate (see FIG. 7), to move the feed screw 67 or the case 68 in a direction intersecting the track 22.

Movement of the case 58 causes the arm 58 associated with the truck 62 to be moved simultaneously. When the center of the arm 58 is aligned with the vertical weld line 6A, the motor 69 is rendered inoperative. Ultrasonic flaw detection is performed in the vicinity of the vertical weld line 6A by repeating the aforesaid movements Px and Pr. Upon completion of the ultrasonic flaw detection performed in the vicinity of the vertical weld line 6A, the motor 69 is rotated in the reverse direction, to return the case 68 to its original position and align the center of the arm 58 with this track 22.

When the motor 39 is rotated in the reverse direction to move the movable truck 34 toward the lower portion of the pressure vessel, the movable truck 34 is moved in such a manner that the pinion 47 is disposed anterior to the pinion 48 with respect to the direction of movement of the movable truck 34. Thus when the ease of transfer of the movable truck 34 from the track 22 to the rotary track 14 is taken into consideration, transfer is preferably carried out by letting the pinion 48 mesh with the rack and releasing the pinion 47 from meshing engagement with the rack when the motor 39 is rotated in the reverse direction.

Figure 11:
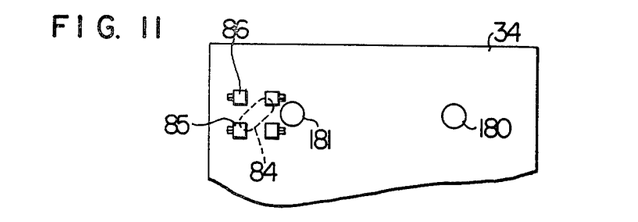
FIG. 11 is a view as seen in the direction of the arrows XI—XI in FIG. 10.

It is necessary to check whether the movable truck 34 is located on the track 22 or 24. The end can be attained by referring to the condition of operation of a mercury switch 84 mounted on the movable truck 34 as shown in FIG. 11. More specifically, when the movable truck 34 is located on the track 22, the mercury switch 84 is rendered operative; when it is located on the track 24, the mercury switch 84 is rendered inoperative. Two pairs of photoelectric tubes 85 and 86 are mounted on the movable truck 34, and the tracks 22 and 24 are formed with a plurality of projections 87 located at regular intervals, to enable the relative distances detected by the encoder to be checked and revised. That is, the point at which the volume of light received from the photoelectric tubes 85 and 86 are minimized as they are blocked by the projection 87 and the reduced volumes of light become equal to each other is selected as a fixed point used for checking and revising the relative positions detected by the encoder.

Figure 12:
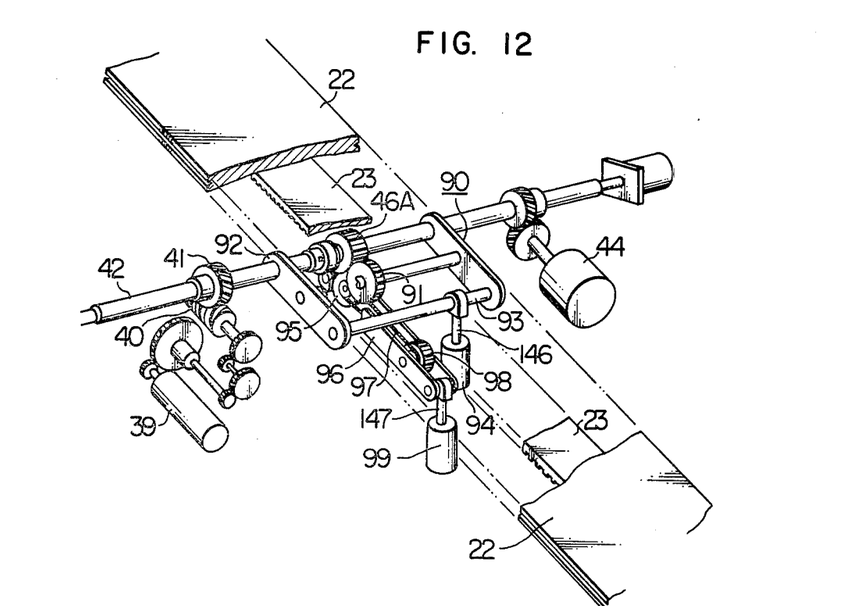
FIG. 12 is a perspective view of a modification of the pinion switching mechanism.

A modification of the pinion switching mechanism will be described by referring to FIG. 12. The pinion switching mechanism 90 comprises pinions 91 and 98 and air cylinders 94 and 99. A pair of pivotal bars 92 interconnected by a bar 93 is supported by the rotary shaft 42 on the movable truck 34. The pinion 91 is supported by a rotary shaft connected to one of the pivotal bars 92 and meshes with a gear 46A supported on the rotary shaft 42. The air cylinder 94 has a piston rod 146 inserted therein which is supported on the lever 93. A gear 95 meshing with the gear 46A and having a sprocket on its side and a pinion 98 having a sprocket on its side are supported on a pair of pivotal bars 96 supported on the rotary shaft 42. A chain 97 is trained over the sprockets of the gear 95 and pinion 98. The air cylinder 99 has a piston rod 147 inserted therein which is supported on a lever interconnecting the pair of pivotal bars 96.

Figure 13A:
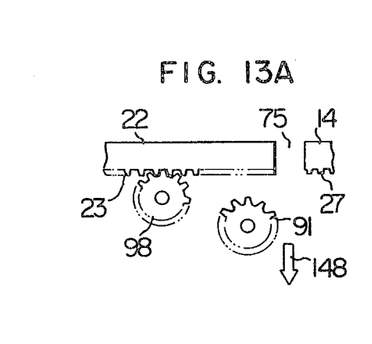
FIGS. 13A–13F are views in explanation of the order of operation of the pinion switching mechanism shown in FIG. 12.
Figure 13B:
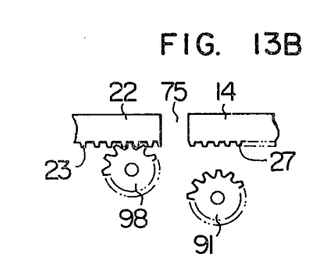
Figure 13C:
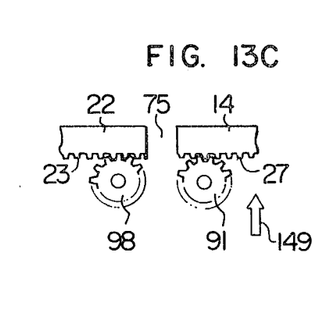
Figure 13D:
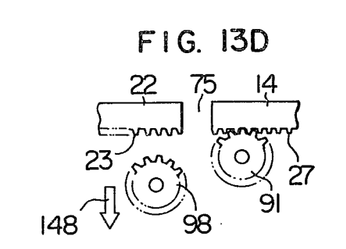
Figure 13E:
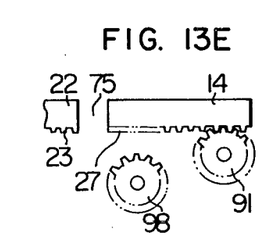
Figure 13F:
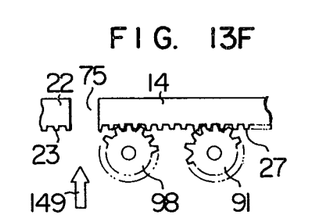

Operation of the pinion switching mechanism 90 will be described by referring to FIGS. 13A and 13B, with regard to the transfer of the movable truck 34 from the track 22 to the rotary track 14. When the movable truck 34 is moving upwardly on the track 22, the pinions 91 and 98 are in meshing engagement with the rack 23 by the action of the air cylinders 94 and 99. Rotation of the motor 39 is transmitted through the worm gear 40, worm wheel 41, rotary shaft 42 and gear 46A to the pinion 98. As the pinion 91 approaches the gap 75 after the movable truck 34 has moved upwardly on the track 22, the piston rod 146 moves to move the pivotal bars 92 in the direction of an arrow 148 away from the rack 23 (FIG. 13A). This allows the movable truck 34 to be only moved by the rotation of the pinion 98, and the pinion 91 passes through the gap 75 and reaches a position above the rotary track 14 (FIG. 13B). The piston rod 146 is moved in the reverse direction to move the bars 92 in the reverse direction in pivotal movement, to move the pinion 91 in the direction of an arrow 149 into meshing engagement with the rack 27 (FIG. 13C). Then the piston rod 146 moves to move the pivotal bars 96 in pivotal movement, to move the pinion 98 in the direction of an arrow 148 away from the rack 23 (FIG. 13D). Rotation of the pinion 91 alone moves the movable truck 34, and the pinion 98 passes through the gap 75 and reaches a position above the rotary track 14 (FIG. 13E). The piston rod 146 is moved in the reverse direction to move the pivotal bars 96 in the reverse direction in pivotal movement, to move the pinion 98 in the direction of an arrow 149 into meshing engagement with the rack 27 (FIG. 13F). Thus transfer of the movable truck 34 from the track 22 to the rotary track 14 is completed. The aforesaid movement of the pinions 91 and 98 in the directions of the arrows 148 and 149 respectively is effected by controlling the supply of compressed air to the air cylinders 94 and 99 by actuating a pair of limit switches A and B, not shown, mounted on the movable truck 34 in place of the aforesaid limit switch 80. The limit switch A is located slightly forwardly of the pinion 91, and the limit switch B is located between the pinions 91 and 98 and slightly forwardly of the pinion 98. When the movable truck 34 moves upwardly in FIG. 4, the operations shown in FIGS. 13A, 13C, 13D and 13F are performed when the limit switch A contacts the projection 78A, the limit switch A contacts the projection 78B, the limit switch B contacts the projection 78A, and the limit switch B contacts the projection 78B, respectively. The ultrasonic flaw detector device provided with the pinion switching mechanism 90 is capable of achieving the same results as the device provided with the pinion switching mechanism 45 described previously.

In the pinion switching mechanism 90, means for bringing the pinion into and out of meshing engagement with the respective rack (which is an air cylinder) is provided for each pair of pinions. By virtue of this feature, one of the pinions is positively kept in meshing engagement with the track when the movable truck 34 is transferred from one track to another, to thereby prevent dislodging of the movable truck from the track. Thus the need to bring the movable truck 34 to a halt during transfer as in the mechanism 45 is eliminated, and the movement of the movable truck 34 is not interrupted during transfer. This allows the time required for effecting transfer of the movable truck 34 to be reduced and permits the transfer to be effected more readily. The need to provide the movable truck 34 with the arms for preventing the dislodging thereof from the track can be eliminated.

The embodiments shown and described hereinabove can have application not only in a pressure vessel of a nuclear reactor of a boiling-water type nuclear power plant, but also in a nuclear reactor vessel of a pressurized-water type nuclear reactor and a fast neutron breeder reactor. They can also be applied to the ultrasonic flaw detection performed on vessels, such as storage tanks for radioactive waste liquids and other industrial waste liquids.

The invention offers the advantage that ultrasonic flaw detection can be carried out automatically without any trouble in two directions (in the axial and circumferential directions, for example) with regard to a vessel.

What is claimed is:

1. In an ultrasonic flaw detector device of the type having:
    at least one first fixed track located outside a vessel;
    at least one second fixed track located outside said vessel and arranged in a direction which intersects said first fixed track; and
    a carrier member supporting ultrasonic flaw detector means for detecting any flaw that might be present in said vessel and movable on each of said tracks;
    the improvement comprising at least one rotary track located at a junction of said first fixed track and said second fixed track for enabling said carrier member to be transferred between said first and second tracks; and
    means for moving said rotatable track in rotary movement between positions that are respectively aligned with the first and second fixed tracks.

2. A ultrasonic flaw detector device as claimed in claim 1, wherein said first and second fixed tracks and said rotary track are disposed in positions substantially equally spaced apart from the surface of said vessel.

3. A ultrasonic flaw detector device as claimed in claim 2, wherein said first fixed track is disposed axially of said vessel and said second fixed track is disposed circumferentially of said vessel.

4. A ultrasonic flaw detector device as claimed in claim 2 or 3, wherein said first and second fixed tracks and said rotary track are located in a space defined between said vessel and a heat insulating wall surrounding said vessel.

5. A ultrasonic flaw detector device as claimed in claim 3, further comprising means for restricting the angle of rotation of said rotary track.

6. A ultrasonic flaw detector device as claimed in claim 3, further comprising means for detecting on which of said fixed tracks said movable member is positioned.

7. A ultrasonic flaw detector device as claimed in claim 1, wherein said first and second fixed tracks and said rotatable track are located in a space defined by said vessel and a heat insulating wall surrounding said vessel.

8. A ultrasonic flaw detector device as claimed in claim 7, wherein said carrier member is positioned between said vessel and said tracks.

9. In an ultrasonic flaw detector device of the type having:
    at least one first fixed track located outside a vessel;
    at least one second fixed track located outside said vessel and arranged in a direction which intersects said first fixed track; and
    a carrier member supporting ultrasonic flaw detector means for detecting any flaw that might be present in said vessel and movable on each of said tracks;
    the improvement comprising at least one rotary track located at a junction of said first fixed track and said second fixed track for enabling said carrier member to be transferred between said first and second fixed tracks;
    means for rotating said rotatable track between positions in alignment with said first and second fixed tracks, respectively;
    first and second rotary members mounted on said carrier member and maintained in contact with said tracks for moving said carrier member; and
    control means operative, when transfer of said carrier member from each of said fixed tracks to said rotary track is carried out, to bring said first rotary member out of contact with the fixed track into contact with said rotary track and to bring said second rotary member in contact with the fixed track from contact therewith.

10. A ultrasonic flaw detector device as claimed in claim 9, wherein said first and second fixed tracks and said movable track and disposed in positions substantially equally spaced apart from the surface of said vessel.

11. A ultrasonic flaw detector device as claimed in claim 10, wherein said first fixed track is disposed axially of said vessel and said second fixed track is disposed circumferentially of said vessel.

12. A ultrasonic flaw detector device as claimed in claim 9, wherein said first and second fixed tracks and said rotary track are located in a space defined between said vessel and a heat insulating wall surrounding said vessel.

13. A ultrasonic flaw detector device as claimed in claim 12, wherein said carrier member is positioned between said vessel and said tracks.

14. A ultrasonic flaw detector device as claimed in any one of claims 9-12, wherein said first and second rotary members comprise pinions adapted to mesh with racks each supported on one of said tracks.

15. In an ultrasonic flaw detector device of the type having:
    at least one first fixed track located in a space defined by a nuclear reactor vessel and a heat insulting wall surrounding said nuclear reactor vessel;
    at least one second fixed track located in said space and extending in a direction intersecting said first fixed track; and
    a carrier member supporting ultrasonic flaw detector means and movable on each of said tracks;
    the improvement comprising at least one rotary track located in a junction of said first fixed track and said second fixed track for enabling transferrence of said carrier member between said first and second fixed track; and
    means for rotating said rotary track between positions in respective alignment with said first and second fixed tracks.

16. A ultrasonic flaw detector device as claimed in claim 15, wherein said first and second fixed tracks are located in positions substantially equally spaced apart from the surface of said vessel.

17. A ultrasonic flaw detector device as claimed in claim 16, wherein said first fixed track is disposed axially of said vessel and said second fixed track is disposed circumferentially of said vessel.

18. A ultrasonic flaw detector device as claimed in claim 17, wherein said carrier member is positioned between said vessel and said tracks.

19. A ultrasonic flaw detector device as claimed in any one of claims 15-17, further comprising a first rotary member and a second rotary member supported on said carrier member for contacting said tracks and moving said carrier member, and control means supported on said carrier member operative, when transfer of said carrier member from each of said fixed tracks to said rotary track is carried out, to bring said first rotary member out of contact with the fixed track into contact with said rotary track and to bring said secondary rotary member in contact with said fixed track out of contact therewith.

20. A ultrasonic flaw detector device as claimed in claim 19, wherein said first rotary member and said second rotary member comprise pinions adapted to mesh with racks each supported on one of said tracks.

* * * * *